Aug. 14, 1956     R. L. JAESCHKE     2,759,136
ELECTRIC MOTOR CONTROL
Filed April 21, 1954

Ralph L. Jaeschke,
Inventor.
Koenig and Pope,
Attorneys.

United States Patent Office 2,759,136
Patented Aug. 14, 1956

2,759,136

ELECTRIC MOTOR CONTROL

Ralph L. Jaeschke, Kenosha, Wis., assignor to Eaton Manufacturing Company, Cleveland, Ohio, a corporation of Ohio Application April 21, 1954, Serial No. 424,550

3 Claims. (Cl. 318—207)

This invention relates to an electric motor control and more particularly to a control for reversing electric motors.

Among the several objects of this invention may be noted the provision of an electric motor control for extremely rapidly reversing the direction of rotation of capacitor-start-induction-run A. C. motors; the provision of such a control which is operative when the motor is running at high speeds; and the provision of a control of the class described which is reliable in operation. Other objects and features will be in part apparent and in part pointed out hereinafter.

The invention accordingly comprises the constructions hereinafter described, the scope of the invention being indicated in the following claims.

Figure 1:
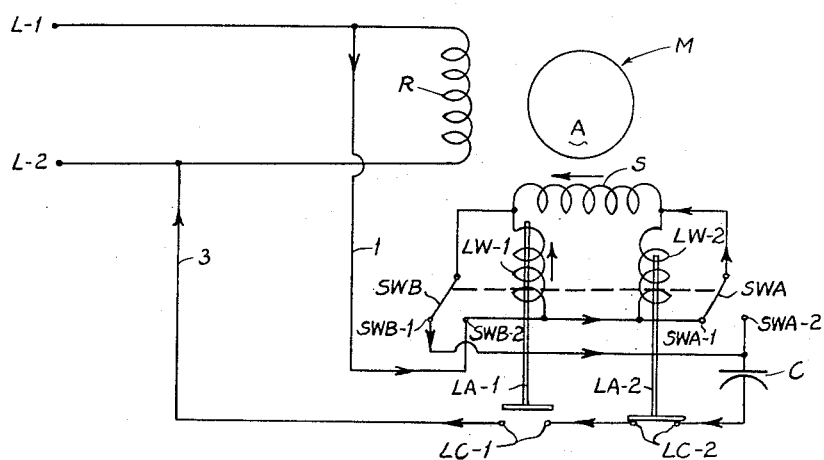
Figure 2:
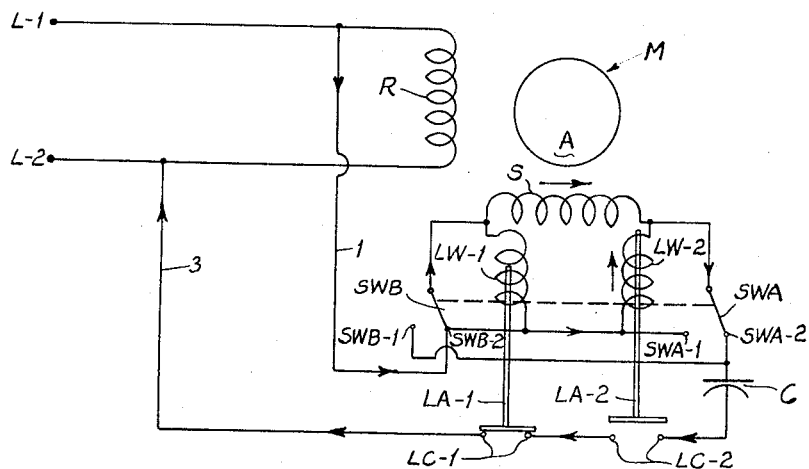

In the accompanying drawings, in which one of various possible embodiments of the invention is illustrated, Fig. 1 is a circuit diagram of one embodiment of an electric motor control of the present invention, illustrating circuit conditions for motor operation in one direction; and, Fig. 2 is a circuit diagram illustrating circuit conditions during operation in a reversed direction.

Corresponding reference characters indicate corresponding parts throughout the several views of the drawings.

Referring now to the drawings, a conventional capacitor-start-induction-run single-phase A. C. motor is illustrated diagrammatically at reference character M. Motor M includes a start winding S and a run winding R associated with a rotor A. Wires L-1 and L-2 serve to connect run winding R to any convenient A. C. power source. Two relay coils LW-1 and LW-2 of first and second motor-starting relays are series-connected with said start winding in a loop circuit. The first motor-starting relay includes an armature LA-1 adapted to open and close a pair of contacts LC-1. The second motor-starting relay similarly includes a corresponding armature LA-2 and contacts LC-2. The relays are of the standard voltage type and are designed to open their contacts upon having an A. C. voltage of a predetermined value impressed across the relay coil, and to maintain the contacts open until the A. C. voltage falls below a second predetermined value, at which time the contacts reclose. The value of the A. C. potential necessary to open the relay contacts corresponds to the voltage across start winding S at a motor speed less than synchronous, and preferably at about the point (known as the hump) where the motor develops peak torque. A typical commercial relay of this type may be designed to open its contacts at a potential of 130 v. A. C., for example, and to maintain the contacts open until the A. C. potential drops below a second predetermined value, such as 30 v. A. C.

An electrical circuit including a capacitor C series-connected with contacts LC-1 and LC-2 is connected by wires 1 and 3 across run winding R. This electrical circuit also includes a double-pole double-throw switch having two mechanically linked switch arms SWA and SWB and two pairs of contacts. The first pair of contacts is indicated at SWB-1 and SWA-2 and these contacts are commonly connected to one terminal of capacitor C. The second pair of contacts is indicated at SWB-2 and SWA-1 and these contacts are commonly connected to the junction of the relay coils LW-1 and LW-2. The switch arms SWB and SWA are connected respectively to the opposite ends of winding S. This double-pole double-throw switch is of conventional construction wherein the switch arms disengage one set of contacts before they engage the second, i. e., there is no overlap.

Operation is as follows:

Upon connection of L-1 and L-2 to a source of A. C. power, run and start windings R and S will be electrically energized. The electrical circuit for winding S is completed from L-1 (as indicated by the arrows) via wire 1, switch contact SWB-2, switch contact SWA-1, switch arm SWA, start winding S, switch arm SWB, contact SWB-1, capacitor C, normally closed contacts LC-2, normally closed contacts LC-1, and wire 3 back to L-2. A parallel current path across winding S is provided through relay coil LW-1. The phase shift of the start-winding field (relative to that of the run winding) resulting from the series capacitor C provides a substantial starting torque. As the speed of rotation of rotor A increases, an increased voltage is induced from run winding R to start winding S by motor rotor A in quadrature phase. As soon as the rotor speed has increased to a value sufficient to apply an A. C. potential of the first predetermined value, e. g. 130 volts, armature LA-1 is picked up by relay coil LW-1, thus opening contacts LC-1 as shown in Fig. 1. Contacts LC-2 remain closed because the associated relay coil LW-2 is shunted by switch arm SWA. The opening of contacts LC-1 breaks the electrical circuit which connects start winding S and capacitor C across run winding R. The energization of the latter supplies power to actuate rotor A at running speeds. The induced A. C. potential across start winding S maintains relay coil LW-1 energized under running conditions.

An exceedingly rapid reversal of the direction of rotation of the rotor can be obtained while said rotor is rotating at high speeds as follows:

Switch arms SWA and SWB are moved from the position shown in Fig. 1 to that illustrated in Fig. 2. This action has three effects. First, switch arm SWB shorts out relay coil LW-1 causing armature LA-1 to drop out, thus reclosing contacts LC-1 and recompleting the electrical circuit from L-1 through start winding S to L-2. The relative impedance ratios of capacitor C to winding S are such that closure of the relay contacts has little effect on the voltage developed across either of the relay coils. Second, the direction of current flow through winding S (relative to the instantaneous direction of current through winding R) is reversed, thus causing start winding S to be energized in an opposite phase relationship to the run winding. Third, the movement of switch arm SWA from contact SWA-1 to SWA-2 connects relay coil LW-2 in parallel with winding S. The induced A. C. potential at the moment of reversal suddenly drops to practically zero, but as soon as the motor rotor approaches synchronous speed (or passes the hump) in the reversed direction the induced A. C. potential exceeds the first predetermined value and causes LA-2 to be picked up thereby breaking the circuit to start winding S. This reestablishes running conditions and the control circuit is prepared for another substantially instantaneous reversal of rotation.

From the foregoing, it can be seen that the control of the present invention will function to reverse the rotational direction of capacitor-start-induction-run A. C. motors while operating at running speeds. Also, this control obviates the need for deenergizing the run winding during reversal and avoids the time delay required for motor rotor deceleration to a speed at which the A. C. potential induced in the start winding drops below the value needed to maintain the starting contacts open.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In combination with a capacitor-start-induction-run A. C. motor having a rotor, a start winding and a run winding adapted to be energized by an A. C. power source; a control comprising first and second motor starting relays, each relay having a relay coil and a pair of relay contacts adapted to open when an A. C. potential of a first predetermined value is applied to its associated coil, the first and second relay coils being series-connected with said start winding in a loop circuit, an electrical circuit connected across said run winding including said pairs of relay contacts connected in series with each other and in series with a capacitor, switching means movable between first and second operative positions and including electrical contacting devices connected at opposite ends of said start winding, said switching means being adapted in said first position to connect said start winding in series in said electrical circuit with a first polarity while simultaneously connecting said first relay coil in parallel with said start winding and shunting said second relay coil, said switching means being adapted in said second position to connect said start winding in said electrical circuit with a reversed polarity while simultaneously connecting said second relay coil in parallel with said start winding and shunting said first relay coil, whereby upon movement of said switching means between said first and second positions said start winding is energized in an opposite phase relationship to said run winding while said run winding is maintained energized and while said rotor is rotating at running speeds, thereby causing the rotor rapidly to reverse its direction of rotation.

2. In combination with a capacitor-start-induction-run A. C. motor having a rotor, a start winding and a run winding adapted to be energized by an A. C. power source; a control comprising first and second motor starting relays, each relay having a relay coil and a pair of relay contacts adapted to open when an A. C. potential of a first predetermined value is applied to its associated coil, the first and second relay coils being series-connected with said start winding in a loop circuit, a double-pole double-throw switch having a first pair of commonly connected contacts and a second pair of commonly connected contacts and first and second switch arms, said switch arms being connected respectively to each opposite ends of the starting winding, said first pair of switch contacts being connected to the junction between the respective relay coils, an electric circuit connected across said run winding including a capacitor connected in series with said relay contacts and said first and second pairs of switch contacts, said switch having a first position wherein said first switch arm is electrically connected to said first pair of switch contacts and said second switch arm simultaneously is electrically connected to said second pair of switch contacts, said switch having a second position wherein said first switch arm is electrically connected to said second pair of switch contacts and the second switch arm simultaneously is electrically connected to said first pair of switch contacts, whereby upon movement of said switch arms between said first and second positions said start winding is energized in an opposite phase relationship to said run winding while said run winding is maintained energized and while said rotor is rotating at running speeds, thereby causing the rotor rapidly to reverse its direction of rotation.

3. A control as set forth in claim 1 wherein said switching means is a double-pole double-throw switch.

References Cited in the file of this patent

UNITED STATES PATENTS

| | | |
|---|---|---|
| 2,545,639 | Wolff et al. | Mar. 20, 1951 |
| 2,640,177 | Wieseman | May 26, 1953 |
| 2,674,710 | Pitman | Apr. 6, 1954 |